United States Patent
Pollock et al.

(10) Patent No.: US 6,419,250 B1
(45) Date of Patent: Jul. 16, 2002

(54) ONE-PIECE FORGED STEERING KNUCKLE ASSEMBLY

(75) Inventors: Paul Pollock; Dave Moses; Dick Ryan; Dennis Mahoney; Peter Berg, all of Ft. Wayne, IN (US)

(73) Assignee: Dana Corporation, Toledo, OH (US)

( * ) Notice: Subject to any disclaimer, the term of this patent is extended or adjusted under 35 U.S.C. 154(b) by 246 days.

(21) Appl. No.: 09/084,871

(22) Filed: May 28, 1998

(51) Int. Cl.$^7$ ................................................ B62D 7/18
(52) U.S. Cl. ................................................ 280/93.512
(58) Field of Search .................. 280/93.512, 93.51, 280/93.502

(56) References Cited

U.S. PATENT DOCUMENTS

| | | | |
|---|---|---|---|
| 3,801,124 A | * | 4/1974 | Afanador et al. ...... 280/93.512 |
| 3,865,394 A | * | 2/1975 | Epner et al. ........... 280/93.512 |
| 3,908,480 A | * | 9/1975 | Afanador et al. ...... 280/93.512 |
| 4,079,799 A | * | 3/1978 | Swan .................... 280/93.502 |
| 4,674,760 A | | 6/1987 | Goulart |
| 5,018,757 A | | 5/1991 | Kozuka |
| 5,022,673 A | | 6/1991 | Sekino et al. |
| 5,199,730 A | * | 4/1993 | Westfall et al. ........ 280/93.512 |
| 5,219,176 A | * | 6/1993 | Mitchell ................ 280/93.512 |
| 5,413,365 A | | 5/1995 | Bodin et al. |
| 5,624,011 A | * | 4/1997 | White et al. ........... 280/93.512 |

* cited by examiner

*Primary Examiner*—Paul N. Dickson
(74) *Attorney, Agent, or Firm*—Linaik, Bernato, Longacre & White

(57) ABSTRACT

A one-piece steering knuckle assembly for vehicles has a flanged body wherein the tie rod arm, hydraulic brake caliper bracket and, in some instances, the steering arm extend from the flanged body in a one-piece forged manner. There are enlarged bosses extending from the flanged body opposite the wheel spindle, the bosses having a bore which are axially aligned to receive a king pin. The flanged body, wheel spindle, tie rod arm and brake caliper bracket are all formed from a single steel billet as a one-piece heavy duty forging. Such a design eliminates the brake caliper/knuckle joint and the tie rod arm/knuckle joint, and thus, it results in savings in assembly time and weight.

5 Claims, 3 Drawing Sheets

ONE-PIECE FORGED STEERING KNUCKLE ASSEMBLY

BACKGROUND OF THE INVENTION a) Field of the Invention

This invention relates to a steering knuckle assembly for vehicles, and more particularly, to a one-piece steering knuckle assembly for vehicles such as trucks wherein the tie rod arm as well as the hydraulic brake caliper bracket and axle spindle are forged together as a single piece.

b) Description of Related Art

In the prior art it is known to provide a steering knuckle with tie rods which are fastened to the knuckle. This design is provided in U.S. Pat. No. 1,755,627. It is also known in the prior art to provide an integral spindle arm with a steering knuckle for suspension purposes as well as to provide an integral brake flange for attachment to a brake backing plate. This design is described in U.S. Pat. No. 2,556,767.

It is well known to provide a steering knuckle for heavy duty motor vehicles such as trucks wherein the steering arm and the tie rod arm are fitted to a steering knuckle by means of a threaded portion and a fastening nut. In the conventional prior art design, the brakes are connected to the axle via a caliper bracket. The bracket is bolted onto the knuckle with a plurality of bolts on the brake flange. Also, the tie rod arm and steering arm are bolted onto the knuckle through a tapered joint.

U.S. Pat. No. 3,908,480 discloses an integrated steering knuckle with tie rod arm, brake rails and separately formed lower knuckle and spindle. U.S. Pat. No. 5,624,011 discloses a forged steering knuckle which has integrated steering and tie rod arms, a spindle, and support elements for a drum brake assembly. U.S. Pat No. 5,219,176 discloses a one-piece steering knuckle assembly wherein a flanged body, wheel spindle and tie rod are formed as a one-piece forging and wherein the flanged body is forged in the form of a brake spider to accommodate disc brakes.

There is a need in the motor vehicle field to provide a steering knuckle assembly wherein the tie rod arm, spindle and hydraulic brake caliper bracket are integrally formed as a one-piece forged unit. Such a design would eliminate the brake caliper/knuckle joint and the tie rod arm/knuckle joint, and thus, it would result in savings in assembly time and weight.

SUMMARY OF THE INVENTION

The present invention provides a one-piece steering knuckle assembly for vehicles such as trucks or the like wherein a hydraulic brake caliper bracket is provided and wherein a wheel spindle, tie rod arm and brake caliper bracket are integrated into the flanged body in a one-piece manner. There are enlarged bosses extending from the flanged body opposite the wheel spindle, the bosses having a bore which are axially aligned to receive a king pin. The flanged body, wheel spindle, tie rod arm and brake caliper bracket are all formed from a single steel billet as a one-piece heavy duty forging. Such a design eliminates the brake caliper/knuckle joint and the tie rod arm/knuckle joint, and thus, it results in savings in assembly time and weight.

Other advantages of the invention will be apparent from the following detailed description and drawings.

DESCRIPTION OF THE PREFERRED EMBODIMENT

Figure 1:
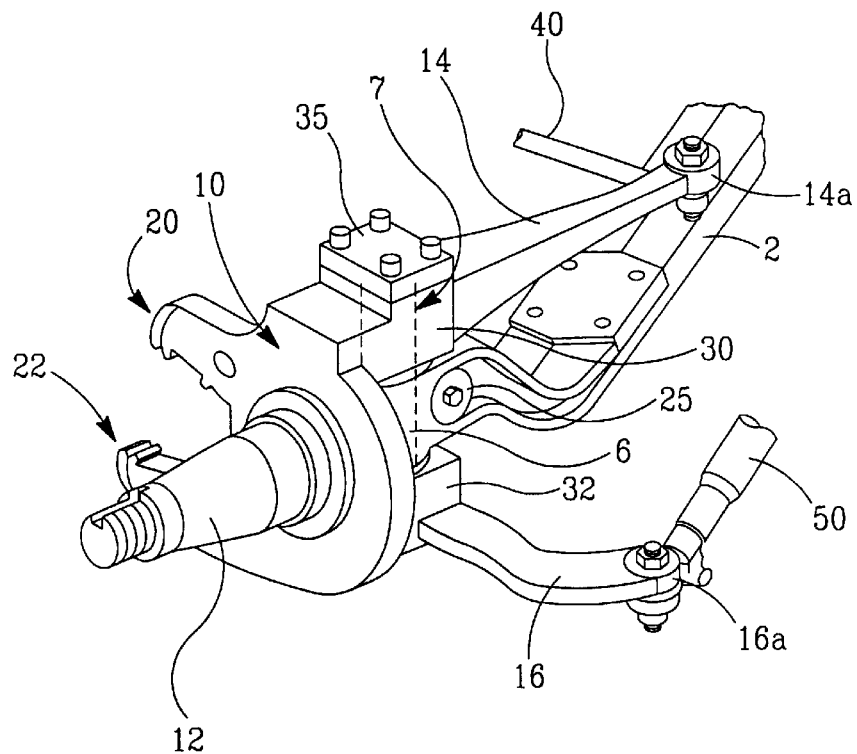
FIG. 1 is a top perspective view illustrating the unitary knuckle assembly of this invention integrated to form an axle, steering rod and tie rod.

With reference to FIG. 1, there is shown a forged body 10 from which extends an integrally formed wheel spindle 12. A steering arm 14 and tie rod arm 16 project from the casting in the manner shown in FIG. 1. The usual vehicle axle is shown at 2 and terminates in a collar. The steering knuckle 6 is connected to the axle 2 by the king pin 7 (see dotted lines in FIG. 1) extending through the enlarged bosses 30 and 32 of the steering arm 14 and the tie rod arm 16, respectively. The king pin 7 is retained in the axle 2 by the bolt and washer shown at 25. The forged body 10 is further provided with upper and lower hydraulic brake caliper brackets 20 and 22, respectively.

Figure 2:
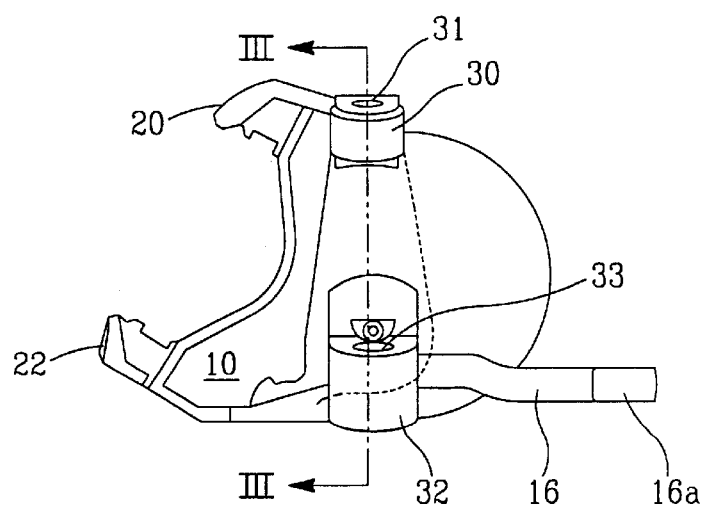
FIG. 2 is a side view of the knuckle assembly of FIG. 1 (with steering arm omitted) as viewed from the side of the assembly including the enlarged bosses.

As best seen in FIG. 2, there are the openings 31, 33 respectively extending through the enlarged bosses 30 and 32 to accommodate the king pin 7. Caps such as shown at 35 in FIG. 1 are fastened to the bosses 30 and 32 by the screws to close the king pin therein. A steering rod 40 is pivotally connected to the steering arm 14 by a nut and bolt arrangement extending through the enlarged boss 14a. Similarly, the tie rod 50 is pivotally connected to the tie rod arm 16 with a bolt and nut arrangement extending through the enlarged boss 16a.

Figure 3:
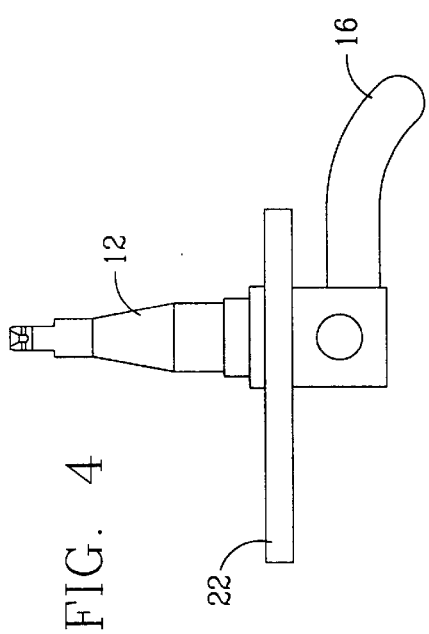
FIG. 3 is a cross sectional view of the knuckle assembly of FIG. 1 as viewed along cross section line III—III of FIG. 2.
Figure 4:
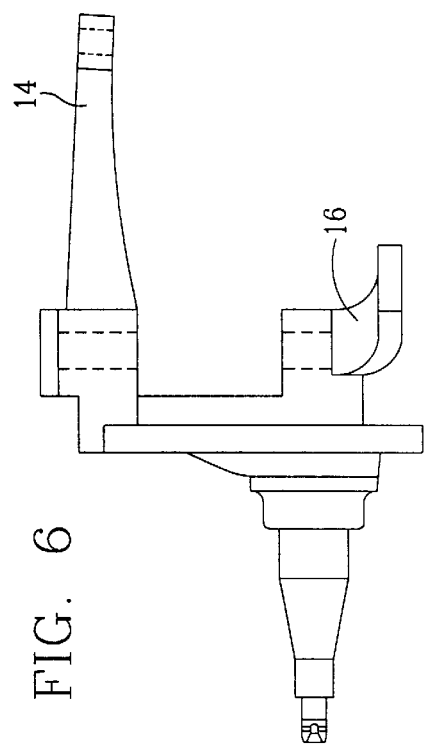
FIG. 4 is a top view of the knuckle assembly of FIG. 1.
Figure 5:
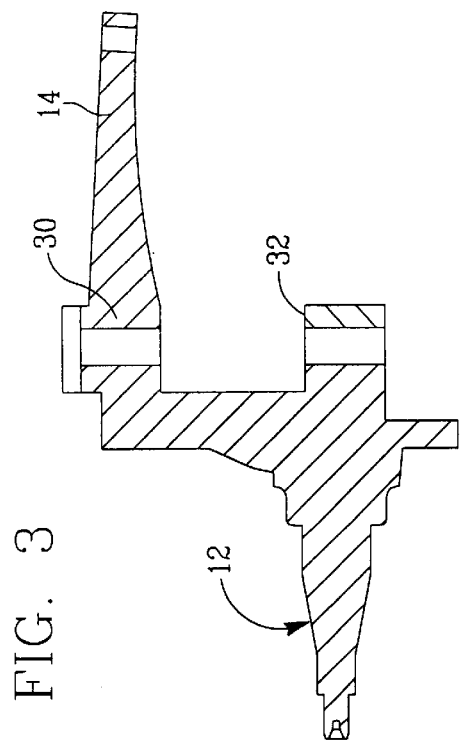
FIG. 5 is a side view of the knuckle assembly of FIG. 1 as viewed from the spindle side of the assembly along the axis of the spindle.

As best seen in FIGS. 1 and 3, the flanged body 11 has brackets 20 and 22 and 40 for an attachment to the hydraulic brake caliper 9 (not shown).

Figure 6:
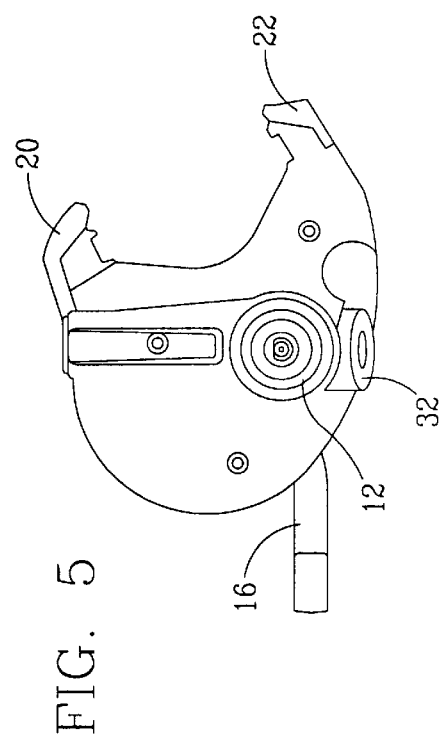
FIG. 6 is a side view of a modified embodiment of the knuckle assembly of the invention including a steering arm.
Figure 7:
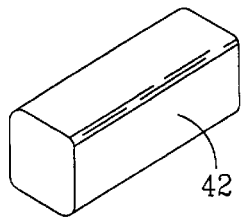
FIGS. 7–14 are perspective views illustrating the forging of the steering knuckle of this invention beginning with a heated billet.

Referring to the modified embodiment of FIG. 6, it is similar to the embodiment shown in FIG. 2 except that it includes a steering arm 14 for connection to a steering rod as illustrated in FIG. 1.

Figure 8:
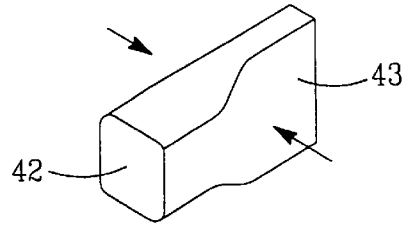
Figure 9:
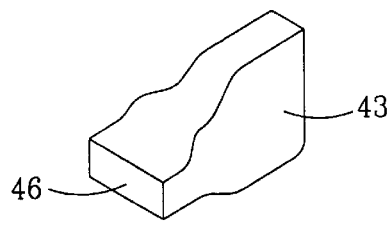
Figure 10:
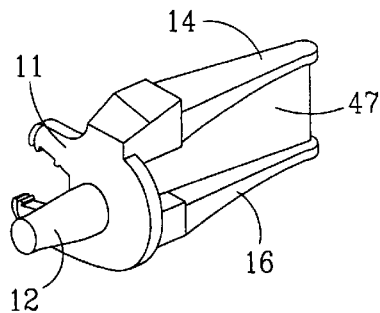
Figure 11:
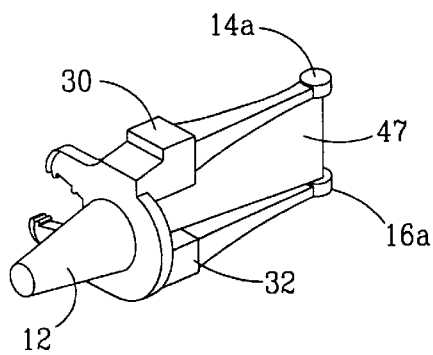
Figure 12:
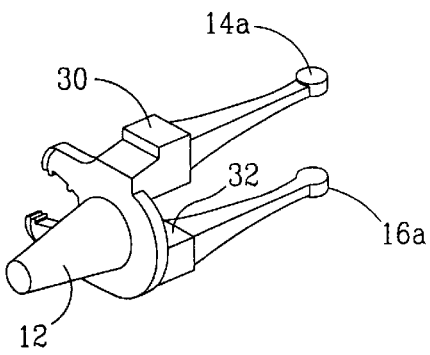
Figure 13:
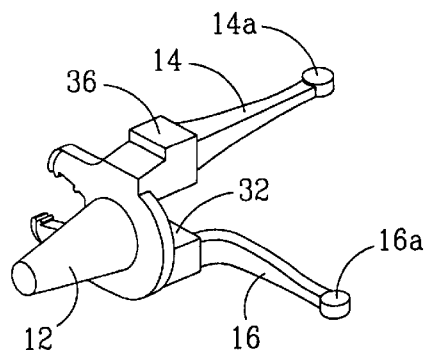
Figure 14:
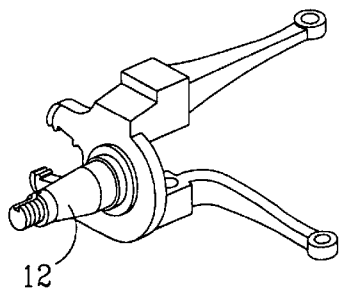

FIGS. 7–14 illustrate the forging of the steering knuckle 10 of this invention. The first step is that depicted in FIG. 7 where a steel billet is heated to forging conditions. The next step in the process is shown in FIG. 8 wherein the heated billet 42 is contacted with a forging roll to provide a reduced section such as shown at 43. Next, and as shown in FIG. 9, a tail end and preform such as shown at 46 is provided and would be effected by forming the billet 42 on a die. After this, and as shown in FIG. 10, a blocking step is effected in which the steering arm 14 and the tie rod arm 16 are formed as well as the flanged body 11 and the wheel spindle 12. Subsequently, and as shown in FIG. 11, a finished forging impression is accomplished wherein the wheel spindle is formed in its finished form and the enlarged bosses 30 and 32 are provided on the steering arm 14 and the tie rod arm 16. FIG. 12 shows the next step which is flash removal such as indicated at 47 in FIGS. 10 and 11. In FIG. 13 the tie rod arm 16 would be bent by die forming to the angular position as shown. The last step is shown in FIG. 14, which is a machining step in which the threads are formed on the wheel spindle 12, the openings are provided in the enlarged bosses 30, 32 and threaded screw bores.

An important feature of this invention is the fact that the one-piece steering knuckles by having the tie rod arms integrally formed with the flanged body 10 eliminates the costly machining and connecting of the separate tie rod arms to prior steering knuckles. This is also true when the steering arms are also integrally forged. The prior procedure requires the forming of separate bosses and machining so that threaded portions of these tie rod arms or steering arms could be fastened thereto. Further, the fact that there is a single flanged body 10 having caliper brackets for connection to a hydraulic brake assembly also avoids the previously used connection. All of these features are incorporated in a one piece steering knuckle assembly which is forged from a single billet of steel for use in heavy duty commercial vehicles such as trucks. This unitary construction not only provides for a rugged and reliable connection, but also reduces the costs of additional components as well as machining and the enlarged connecting bosses which require additional steel for their fabrication.

Steel is the preferred metal used in forging the billet into a unitary steering knuckle. While the steering arms and the tie rod arms are shown at certain geometric positions with respect to the flanged body 10, it is obvious that they can take various forms and angles with respect thereto.

While the foregoing invention has been shown and described with respect to preferred embodiments, it will be understood by those possessing skill in the art that various changes in form and detail may be made without departing from the spirit and scope of the invention described herein.

We claim:

1. A one-piece forged steering knuckle assembly for a vehicle, said knuckle assembly comprising:

a flanged body;

hydraulic brake caliper brackets constructed and arranged to receive a hydraulic brake assembly, said caliper brackets formed as a pair of caliper rails protecting from said flanged body defining a c-shaped member for directly engaging a brake caliper;

a wheel spindle extending from a first side of said flanged body;

upper and lower enlarged bosses extending from a second side of said flanged body opposite said wheel spindle, said bosses having a bore with said bores being axially aligned to receive a king pin; and a tie rod arm extending from said lower enlarged boss and away from said second side of said flanged body and spaced therefrom in a generally parallel manner,
   said flanged body, wheel spindle, tie rod arm, enlarged bosses and brake caliper brackets all being formed from a single steel billet as a one-piece heavy duty forging.

2. The steering knuckle assembly of claim 1, further comprising a steering arm.

3. The steering knuckle as defined in claim 2, wherein said steering arm and said tie rod arm include additional enlarged bosses at ends opposite said flanged body, said additional enlarged bosses having bores therethrough for connection with steering and tie rod linkages.

4. The steering knuckle as defined in claim 2, wherein said wheel spindle is formed to said flanged body opposite said steering and tie rod arms.

5. The steering knuckle assembly of claim 1, further comprising a pair of slots formed on said c-shaped member so as to face one another and receive said brake caliper.

* * * * *